(12) United States Patent
Moore

(10) Patent No.: US 7,349,839 B2
(45) Date of Patent: Mar. 25, 2008

(54) METHOD AND APPARATUS FOR ALIGNING BILINGUAL CORPORA

(75) Inventor: Robert C. Moore, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 903 days.

(21) Appl. No.: 10/229,125

(22) Filed: Aug. 27, 2002

(65) Prior Publication Data

US 2004/0044530 A1     Mar. 4, 2004

(51) Int. Cl.
*G06L 17/28*     (2006.01)

(52) U.S. Cl. .............................. 704/2; 704/9; 704/254

(58) Field of Classification Search ............... 704/2, 704/9, 254
See application file for complete search history.

(56) References Cited

U.S. PATENT DOCUMENTS

| | | | | |
|---|---|---|---|---|
| 5,109,509 | A * | 4/1992 | Katayama et al. ............. | 704/9 |
| 5,768,603 | A * | 6/1998 | Brown et al. ................... | 704/9 |
| 6,092,034 | A * | 7/2000 | McCarley et al. ............. | 704/2 |
| 6,182,026 | B1 * | 1/2001 | Tillmann et al. ............... | 704/2 |
| 6,304,841 | B1 * | 10/2001 | Berger et al. .................. | 704/2 |
| 6,665,642 | B2 * | 12/2003 | Kanevsky et al. ........... | 704/260 |
| 2002/0065658 | A1 * | 5/2002 | Kanevsky et al. ........... | 704/260 |

OTHER PUBLICATIONS

L. Rabiner, "A Tutorial on Hidden Markov Models and Selected Applications in Speech Recognition," Proceedings of the IEEE, vol. 77, No. 2, pp. 257-286 (Feb. 1989).

W. Gale et al., "A Program for Aligning Sentences in Bilingual Corpora," Computational Linguistics, vol. 19, No. 1, pp. 75-102 (1993).

I. Dagan et al., "Termight: Coordinating Humans and Machines in Bilingual Terminology Acquisition," Machine Translation, vol. 12, pp. 89-107 (1997).

S. Chen, "Aligning Sentences in Bilingual Corpora Using Lexical Information," Proceedings of the 31st Annual Meeting of the Association for Computational Linguistics, pp. 9-16 (1993).

P. Brown et al., "Aligning Sentences in Parallel Corpora," Proceedings of the 29th Annual Meeting of the Association for Computational Linguistics, pp. 169-176 (1991).

J. Goodman, "Global Thresholding and Multi-Pass Parsing," Harvard University, 15 pages, undated.

(Continued)

*Primary Examiner*—Richemond Dorvil
*Assistant Examiner*—Qi Han
(74) *Attorney, Agent, or Firm*—Theodore M. Magee; Westman, Champlin & Kelly, P.A.

(57) ABSTRACT

A method is provided for aligning sentences in a first corpus to sentences in a second corpus. The method includes applying a length-based alignment model to align sentence boundaries of a sentence in the first corpus with sentence boundaries of a sentence in the second corpus to form an aligned sentence pair. The aligned sentence pair is then used to train a translation model. Once trained, the translation model is used to align sentences in the first corpus to sentences in the second corpus. Under aspects of the invention, pruning is used to reduce the number of sentence boundary alignments considered by the length-based alignment model and by the translation model. In further aspects of the invention, the length-based model utilizes a Poisson distribution.

17 Claims, 6 Drawing Sheets

OTHER PUBLICATIONS

P. Brown et al., "The Mathematics of Statistical Machine Translation: Parameter Estimation," Computational Linguistics, vol. 19, No. 2, pp. 263-311 (1993).

M. Simard et al., "Bilingual Sentence Alignment: Balancing Robustness and Accuracy," Machine Translations, vol. 13, pp. 59-80 (1998).

R. Moore, "Fast and Accurate Sentence Alignment of Bilingual Corpora," 5th Conference on the Association for Machine Translation in the Americas, Oct. 8, 2002, Tiburon, CA, pp. 135-144.

D. Wu, "Aligning a Parallel English-Chinese Corpus Statistically with Lexical Criteria," 32nd Annual Meeting of the Association for Computational Linguistics, Jun. 1994, Las Cruces, NM, pp. 80-87.

L. Rabiner, "A Tutorial on Hidden Markov Models and Selected Applications in Speech Recognition," Proceedings of the IEEE, IEEE, New York, US, vol. 77, No. 2, Feb. 1, 1989, pp. 257-285.

European Search Report for Application No. 03015479.3, filed Jul. 9, 2003.

* cited by examiner

METHOD AND APPARATUS FOR ALIGNING BILINGUAL CORPORA

BACKGROUND OF THE INVENTION

The present invention relates to aligning bilingual corpora. In particular, the present invention relates to length-based and word correspondence-based alignment.

Sentence-aligned parallel bilingual corpora have proved very useful for applying machine learning to machine translation and other NLP tasks. Unfortunately, most available parallel bilingual corpora, such as the proceedings of the Canadian Parliament, do not originate in a sentence-aligned form. Thus, before the corpora can be used for machine learning, their sentences must be aligned.

Aligning sentences is not trivial because at times a single sentence in one language is translated as two or more sentences in the other language. In addition, because of imperfections in the corpora, a sentence found in one corpus may not be present in the other corpus.

In the past, two general techniques have been used for aligning bilingual corpora. The first approach is word-based or character-based. Under this approach, a bilingual lexicon is used to align individual words in each corpus. Because of the complexity of determining the alignment of individual words it is undesirably slow. In addition, it requires the existence of the bilingual lexicon and thus cannot be used to align corpora if such a lexicon is not available.

The second general method for aligning bilingual corpora uses probabilistic modeling of the relationship between the length of sentences in one language and the length of their translations in the other language. Although such length-based systems are faster than the word-based systems, they are not as accurate.

Thus, an alignment system is needed that is fast, highly accurate and does not require a bilingual lexicon.

SUMMARY OF THE INVENTION

A method is provided for aligning sentences in a first corpus to sentences in a second corpus. The method includes applying a length-based alignment model to align sentence boundaries of a sentence in the first corpus with sentence boundaries of a sentence in the second corpus to form an aligned sentence pair. The aligned sentence pair is then used to train a translation model. Once trained, the translation model is used to align sentences in the first corpus to sentences in the second corpus.

Under one aspect of the invention, the length-based alignment includes a step of pruning possible sentence boundary alignments such that the translation model is used to score only those sentence boundary alignments that were not pruned by the length-based alignment.

Under a second aspect of the invention, the length-based alignment utilizes a Poisson distribution to describe the likelihood that a sentence in the first corpus will have a first length given a sentence of a second length in the second corpus.

DETAILED DESCRIPTION OF ILLUSTRATIVE EMBODIMENTS

The discussion of FIG. 1 below is simply to set out but one illustrative environment in which the present invention can be used, although it can be used in other environments as well.

Figure 1:
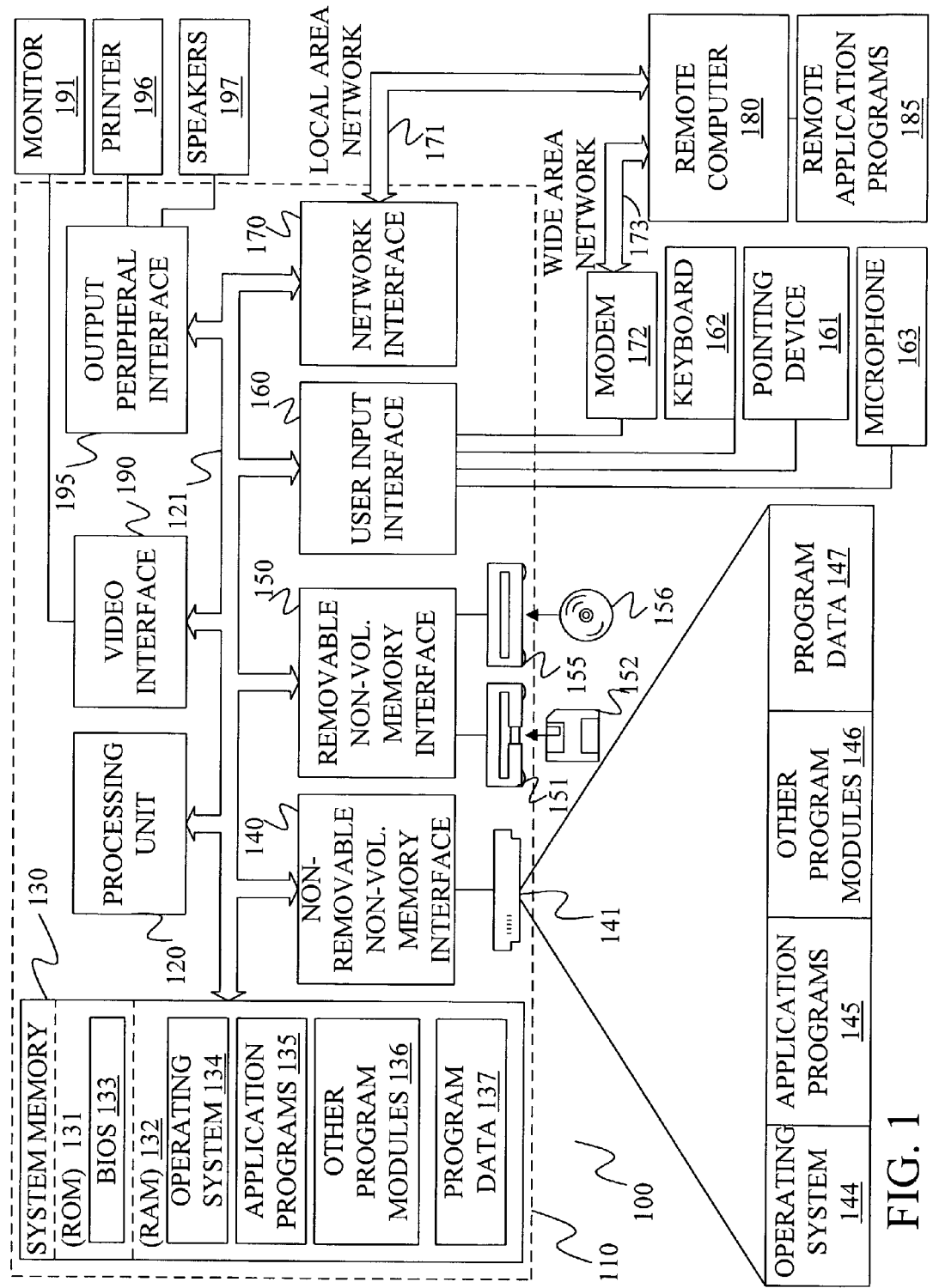
FIG. 1 is a block diagram of a general computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Under the present invention, two corpora of text are aligned such that a sentence that conveys an idea in one corpus is aligned with a sentence that conveys the same idea in the other corpus. Under most embodiments, each corpus is written in a separate language. For the discussion below, two arbitrary languages, language E and language F, are used to illustrate embodiments of the present invention.

Figure 2:
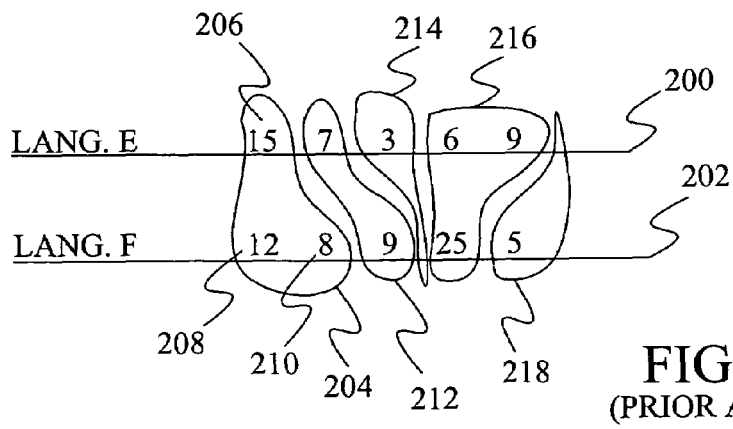
FIG. 2 is an alignment diagram showing the possible alignment of sentences from two corpora.

FIG. 2 provides a diagram showing the alignment of a corpus written in language E with a corpus written in language F along sentence boundaries. In FIG. 2, each corpus is represented by a string of numbers with language E represented by string 200 and language F represented by string 202. Each number in the string represents the number of words found in a single sentence of the corpus. Thus, the number "15" in string 200 represents a single sentence having 15 words in language E.

Points of alignment between the two corpora are shown in FIG. 2 by grouping the sentences that are aligned within a single boundary. For example, boundary 204 extends around sentence 206 of the language E corpus and sentences 208 and 210 of the language F corpus to show that sentence 206 is aligned with the combination of sentences 208 and 210. Other alignments are shown with boundaries 212, 214, 216, and 218.

As shown in FIG. 2, the present invention supports many types of alignments including: alignment of one sentence in language E with two sentences in language F, referred to as a type eff alignment and shown as boundary 204; alignment of two sentences in language E with one sentence in language F, referred to as a type eef alignment and shown as boundary 216; alignment of one sentence in language E with one sentence in language F, referred to as a type ef or one-to-one alignment and shown as boundary 212; alignment of one sentence in language E with no sentence in language F, referred to as a type e alignment and shown as boundary 214; and alignment of one sentence in language F with no sentence in language E, referred to as a type f alignment and shown as boundary 218.

Figure 3:
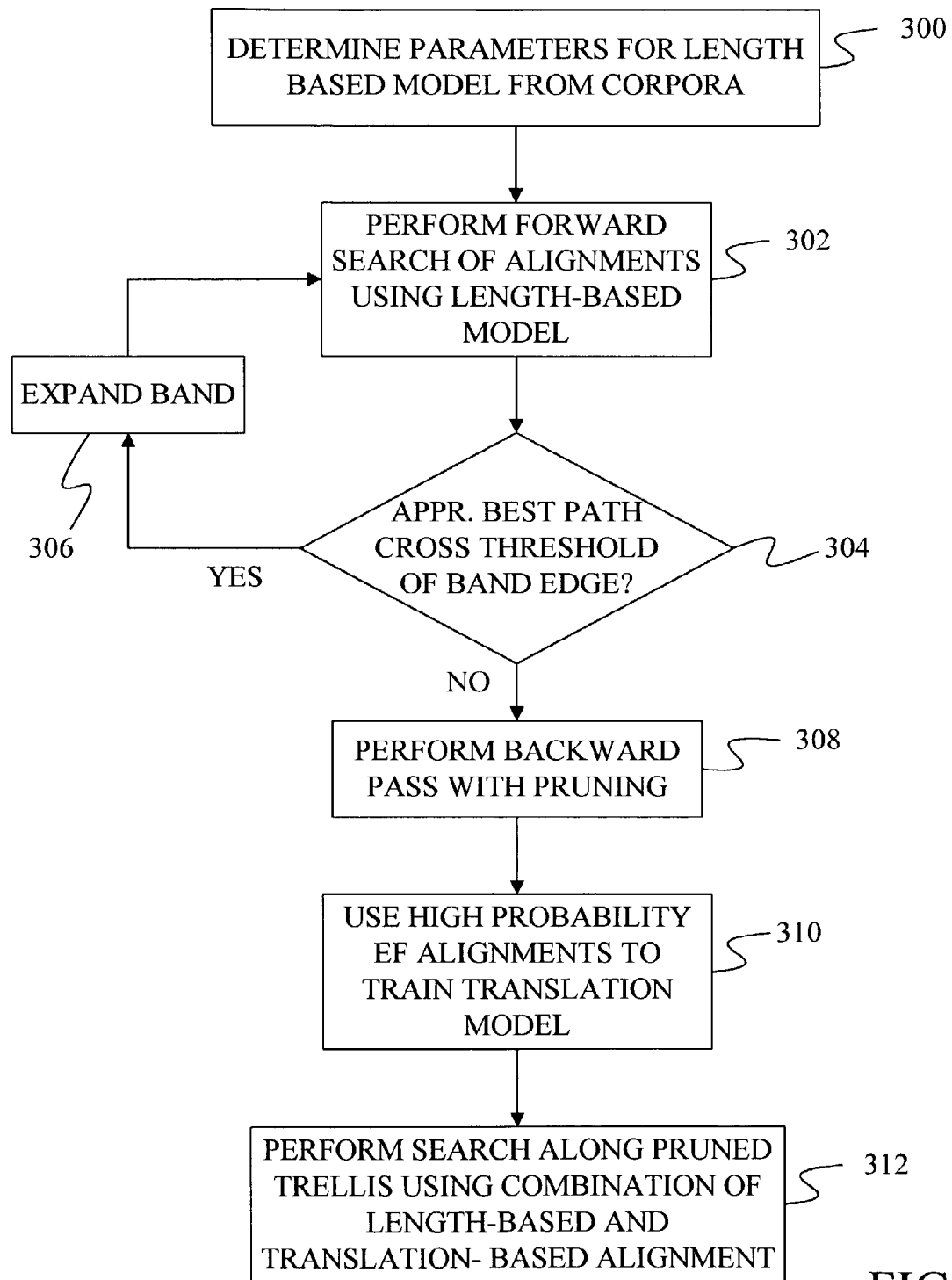
FIG. 3 is a flow diagram for aligning corpora under embodiments of the present invention.

FIG. 3 provides a flow diagram of a method of aligning two corpora under many embodiments present invention. In summary, the method first builds and uses a length-based alignment model to identify likely type ef alignments and to prune some sentence boundary alignment states. Using the type ef alignments, a translation model is constructed and this is then used in combination with the length-based alignment model to identify a best alignment for the two corpora.

The method of FIG. 3 begins at step 300 where the parameters of the length-based alignment model are determined from the corpora. These parameters are used to calculate a probability of a particular alignment, which is defined as:

$$p(\text{alignment}) = \prod_{x=1}^{J} p(\text{Alignment\_Type})_x p(\text{length\_combination})_x \quad \text{EQ. 1}$$

where p(alignment) is the probability of a particular alignment across the corpora, J is the number of alignment segments or points of alignment in the corpora, p(Alignment_Type)$_x$ is the probability of the alignment type for segment x, such as the probability of a type eef or type ef alignment, and p(length_combination)$_x$ is the probability of the sentences in segment x having a particular combination of lengths.

Under one embodiment of the present invention, the probabilities for the alignment types are estimated as:

$p(\text{type\_e}) = 0.01$ $p(\text{type\_f}) = 0.01$ $p(\text{type\_ef}) = 0.927$ $p(\text{type\_eef}) = 0.026$ $p(\text{type\_eff}) = 0.026$ The probabilities for the sentence length combinations are determined based on the alignment type. For alignment types e and f, the only probabilities needed to determine the length combination probability are $p(l_e)$, the length of the sentence in language E, and $p(l_f)$, the length of the sentence in language F, respectively. Under one embodiment, $p(l_e)$ and $p(l_f)$ are determined by determining the relative frequency of sentences of each length found in each corpus. For example, to determine the probability of a sentence of length eight in the language E corpus, the number of sentences in the language E corpus that have a length of eight is divided by the total number of sentences in the language E corpus.

The probability of sentence length combinations for type ef alignments (one-to-one alignments) is defined as:

$$p(\text{length-combination}) = p(l_e)p(l_f|l_e) \quad \text{EQ. 2}$$

where $p(l_e)$ is the probability of a sentence of length $l_e$ for language E, which is determined in the same manner as described above for type e alignments, and $p(l_f|l_e)$ is the probability of a sentence of length $l_f$ in language F given a sentence of length $l_e$ in language E.

In previous length-based alignment systems, $p(l_f|l_e)$ has been modeled as a Gaussian distribution based on the log of the ratio of length $l_e$ to length $l_f$. A Gaussian distribution includes two hidden parameters, a mean and a variance, for each length $l_e$. Although the mean of the Gaussian distribution could be estimated based on the average lengths of sentence found in each corpus, the variances could not be estimated without having aligned corpora. As a result, prior art systems had to use an Expectation-Maximization (EM) algorithm to identify those parameters by iteratively estimating the parameters and then using the estimates to form estimated alignments. In particular, the prior art first estimated the means and variances of the Gaussian model, then used the estimated model to identify a likely alignment. Based on this alignment, the means and variances of the Gaussian model would be updated. The updated model would then be used to identify a new alignment. This would continue until the model became stable at which point the final means and variances would be selected for the model.

Such EM training is slow and computationally expensive. Under the present invention, this EM training is avoided by modeling the probability $p(l_f|l_e)$ using a Poisson distribution. Such a distribution is described as:

$$p(l_f | l_e) = \frac{\exp(-l_e r)(l_e r)^{l_f}}{(l_f!)} \quad \text{EQ. 3}$$

where r is the ratio of the mean length of sentences in language F over the mean length of sentences in language E. By modeling this probability using a Poisson distribution, the present invention does not have to identify any hidden parameters and thus can determine the probability without EM training.

For type eff alignments, the length combination probability is defined as:

$$p(\text{length\_combination}) = p(l_e)p(l_{f1} + l_{f2} | l_e) \frac{p(l_{f1})p(l_{f2})}{\sum_{i=1}^{l_{f1}+l_{f2}-1} p(i)p(l_{f1} + l_{f2} - i)} \quad \text{EQ. 4}$$

where $p(l_e)$ is the probability of a sentence of length $l_e$ in language E, f1 and f2 are the first and second sentences of language F in the type eff alignment, $p(l_{f1})$ and $p(l_{f2})$ are the probabilities of a sentence of length $l_{f1}$ and $l_{f2}$, respectively, in language F, and $p(l_{f1}+l_{f2}|l_e)$ is the probability of a sentence of combined length $l_{f1}+l_{f2}$ in language F given a sentence of length $l_e$ in language E. The denominator on the right-hand side of equation 4 provides the sum of the probabilities for each possible combination of two sentence lengths that have a combined sentence length of $l_{f1}+l_{f2}$.

The probabilities $p(l_e)$, $p(l_{f1})$, and $p(l_{f2})$ are determined in the same manner as described above for type e alignments and type f alignments. The probability $p(l_{f1}+l_{f2}|l_e)$ is determined using the Poisson distribution described in EQ. 3 while treating the combined length $l_{f1}+l_{f2}$ as a single sentence length in language F.

For type eef alignments, the length combination probability is determined as:

$$p(\text{length\_combination})=p(l_{e1})p(l_{e2})p(l_f|l_{e1}+l_{e2}) \quad \text{EQ. 5}$$

where $p(l_{e1})$ and $p(l_{e2})$ are the probabilities of sentences of respective lengths $l_{e1}$ and $l_{e2}$ in language E, and $p(l_f|l_{e1}+l_{e2})$ is the probability of a sentence of length $l_f$ in language F given a sentence of the combined length $l_{e1}+l_{e2}$ in language E.

Probabilities $p(l_{e1})$ and $p(l_{e2})$ are determined in the same manner as described above for type e alignments. Probability $p(l_f|l_{e1}+l_{e2})$ is determined using the Poisson distribution of Equation 3 with the combined length $l_{e1}+l_{e2}$ treated as the length of a single sentence in language E.

Thus, in step 300, the alignment type probability is estimated for each alignment type and a probability $p(l_e)$ for each sentence length in language E and a probability $p(l_f)$ is determined for each sentence length in language F. In addition, a ratio r of the mean length of sentences in language F to the mean length of sentences in language E is determined for use in calculating the probabilities $p(l_f|l_e)$.

Figure 4:
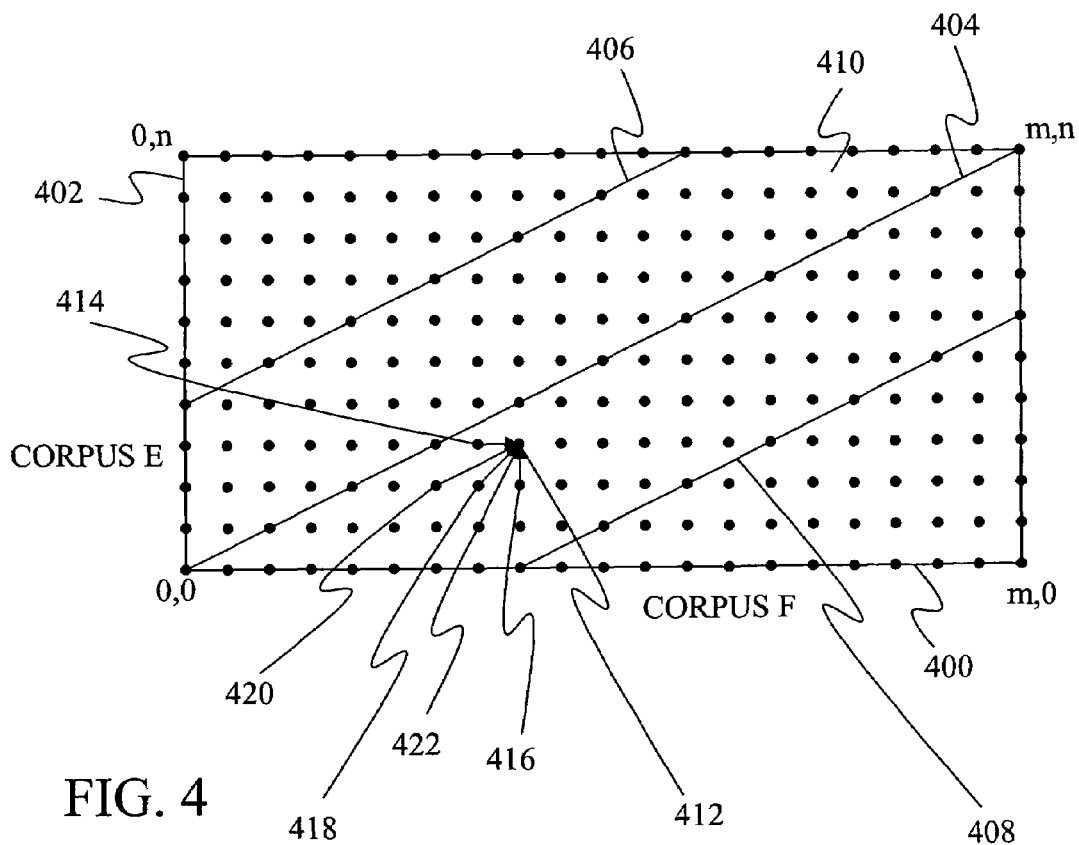
FIG. 4 is an alignment trellis showing the concept of a search band used in the present invention.

After the parameters have been trained for the length-based alignment model, the process of FIG. 3 continues at step 302, where a forward search of possible alignments is performed using the length-based alignment model. This forward search can be represented as a search for a path through an alignment trellis, where each point in the trellis represents a point of possible sentence boundary alignment between the two corpora. FIG. 4 is a diagram of such an alignment trellis where sentence boundaries for the corpus of language F are shown along horizontal axis 400 and sentence boundaries for the corpus of language E are shown along vertical axis 402. As shown in FIG. 4, the corpus of language F has m sentence boundaries while the corpus of language E has n sentence boundaries.

To be a successful alignment, the alignment must intersect point 0,0 representing the start of each corpus and point m,n representing the end of each corpus. Theoretically, any path between these two points could be the proper alignment for the two corpora. However, this represents a large number of paths making the search for the best alignment path computationally costly and for large corpora intractable.

To overcome this, one aspect of the present invention provides a means to limit the number of paths that must be considered while insuring that the best path is still found. Under these embodiments of the invention, the present inventor has recognized that the best alignment is likely to track near a diagonal 404 between point 0,0 and point m,n. To reduce the space that must be searched, these embodiments create a search band around diagonal 404 by defining search borders 406 and 408. The search is then confined to paths that remain within the search borders. Thus, the search is confined to search area 410. This is equivalent to pruning the boundary alignment points that are outside of the search borders.

To determine which boundary alignment points to consider, one embodiment of the present invention first determines a slope of the diagonal line 404 by dividing the number of sentence boundaries, n, in language E by the number of sentence boundaries, m, in the language F. For each sentence boundary in language F, the expected corresponding sentence boundary in language E is computed by multiplying the position of the language F boundary by the slope to identify an expected position for the corresponding sentence boundary in language E. For example, if the language F sentence boundary was the fifth sentence boundary in the set of sentence boundaries, the expected position for the corresponding sentence boundary in language E would be five times the slope.

The search band is defined by considering, for each sentence boundary in language F, only corresponding sentence boundaries in language E that are within some distance D of the expected corresponding sentence boundary in E, as defined above. The width of the search band is, therefore twice the value of D (encompassing boundary points both greater than and less than the expected boundary point by up to D points).

Under one embodiment, the forward search of step 302 involves identifying a forward state probability score for each point within search area 410, which represents the probability of reaching a point by any path from the initial point 0,0. The forward state probability score is calculated to be equal to the sum of the probabilities of all possible paths leading to the point from the initial point 0,0. The are many such paths, but all paths end in one of at most five final steps. For example, there are five possible final steps for reaching point 412 of FIG. 4. They include a step from point 414 representing a type f alignment, a step from point 416 representing a type e alignment, a step from point 418 representing a type ef alignment, a step from point 420 representing a type eff alignment, and a step from point 422 representing a type eef alignment. Thus, a separate path probability is determined for each set of paths from 0,0 to point 412 passing through points 414, 416, 418, 420, and 422, and these separate probabilities are summed to form the forward state probability score for point 412.

Each path probability is the product of the forward state probability for the preceding point and the probability of the alignment represented by the path between the two points. In terms of an equation:

$$\text{path\_prob}_{ji}=\text{state\_prob}_j \cdot p(\text{Alignment\_Type})_{ji} \cdot p(\text{length\_combination})_{ji} \quad \text{EQ. 6}$$

where $\text{path\_prob}_{ji}$ is the path probability for the set of paths passing through state j to state i, $\text{state\_prob}_j$ is the forward state probability of state j, $p(\text{Alignment\_Type})_{ji}$ is the alignment type probability for the type of alignment represented by the path from state j to state i, and $p(\text{length\_combination})_{ji}$ is the length combination probability for the sentences in the alignment represented by the transition from state j to state i.

While determining a forward state probability score for each point within search area 410, the forward search also stores the estimated best path into each state. This estimated best path is the path that provides the highest path probability. It is stored using a reference to the point that precedes the current point on the path.

Figure 5:
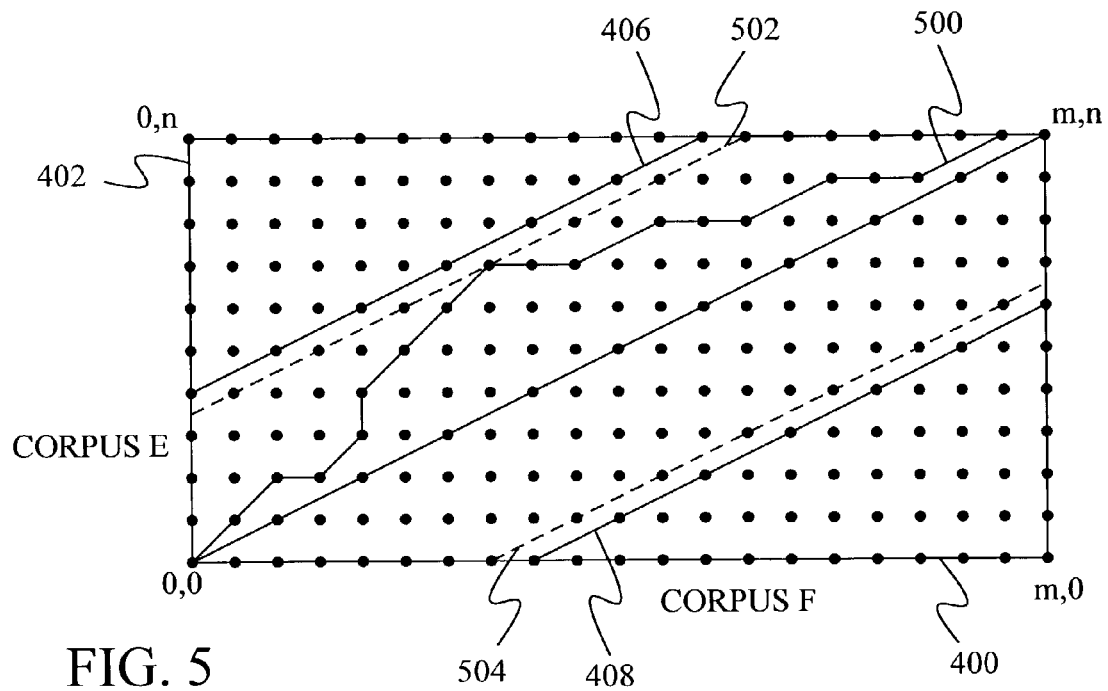
FIG. 5 is an alignment trellis showing an estimated best path that crosses within a threshold of a search border.

As those skilled in the art will recognize, this forward search begins at point 0,0 and proceeds outwardly through the search area toward ending point m,n. When the search reaches m,n, it tracks back through the states along the estimated best path. An example of such an estimated best path is shown as path 500 in FIG. 5. As the search tracks back along the best path, it determines if any of the points along the best path are within a threshold of search boundaries 406 and 408 at step 304. Examples of these thresholds are shown as threshold boundaries 502 and 504 in FIG. 5. Although the threshold is shown as being larger than zero in FIG. 5, those skilled in the art will recognize that other threshold values are possible within the scope of the present invention including threshold values of zero.

Figure 6:
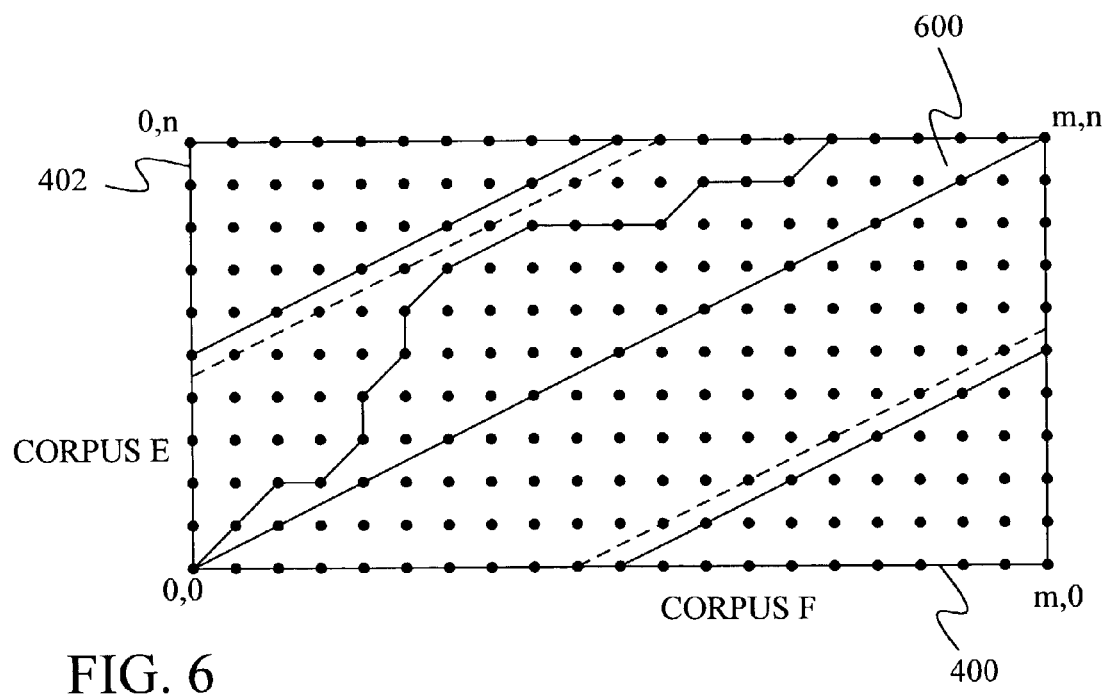
FIG. 6 is an alignment trellis with an expanded search band and a re-calculated estimated best path.

If a point along the estimated best path is within the threshold of the search boundaries, it is possible that the best path has not been found because the best path was excluded by the search boundaries. To correct this, the search band is expanded at step 306 of FIG. 3 and the forward search is re-executed at step 302. FIG. 6 shows the alignment trellis with an expanded search band forming an expanded search area 600. Note that because of the expanded search area, the estimate of the best path through the trellis may be different than the estimate of the best path before the search band was expanded.

Once a best estimated path through the alignment trellis is found that does not cross within the threshold amount of the search boundaries, the forward search is complete.

Note that although the use of the search band to perform the forward search was described above in the context of aligning two text corpora, it can be equally applied to searching for the alignment of other items such as DNA letter sequences.

After the forward search is complete, a backward search is performed at step 308. This backward search computes a backward state probability score for each point, representing the probability of reaching the final point m,n from the given point by any possible path. It is computed in a manner analogous to the way the forward state probability scores are computed, as is well-known to those skilled in the art. During this backward search, threshold pruning is used to remove alignment states that are unlikely to be occupied by the final alignment. In particular, if $\alpha(S_{i,j})$ and $\beta(S_{i,j})$ are the forward and backward probability scores, respectively, for a state i,j at sentence boundary i of language F and sentence boundary j of language E, and $\alpha(S_{m,n})$ is the forward probability score at the final state of the alignment trellis, the probability of the alignment passing through state i,j is defined as:

$$p(S_{i,j}) = \frac{\alpha(S_{i,j})\beta(S_{i,j})}{\alpha(S_{m,n})} \quad \text{EQ. 7}$$

The forward path probability used in Equation 7 represents the combined probability of all paths that begin at 0,0 and pass through state i,j and the backward path probability used in Equation 7 represents the combined probability of all paths that begin at state i,j and end at state m,n.

The total state probability scores defined by Equation 7 are computed during the backward search as soon as the backward state probability score β for a given point is computed, since the necessary values of α have already been computed during the forward search. If the total state probability score is less than a fixed threshold, the point is pruned out from use in computing backward probability scores for other states and from later consideration in step 312. Under one embodiment, this threshold is set to an initial value that is reduced each time the search band in the forward search is widened, to allow more possibilities to be considered in cases where the best alignment is less certain.

As part of the backward pass, probability scores are generated for each type ef alignment (one-to-one alignments) as the product of the probability of the alignment type and the probability of the length combinations as found in equation 6 above, multiplied by the backward state probability score for the boundary alignment point at the end of the alignment and the forward state probability score for the boundary alignment point at the beginning of the alignment, divided by the forward state probability score for the final point m,n. This represents the probability of this particular alignment, given the two corpora. Alignments with high probability scores are stored in memory and are used below to train a translation model.

Figure 7:
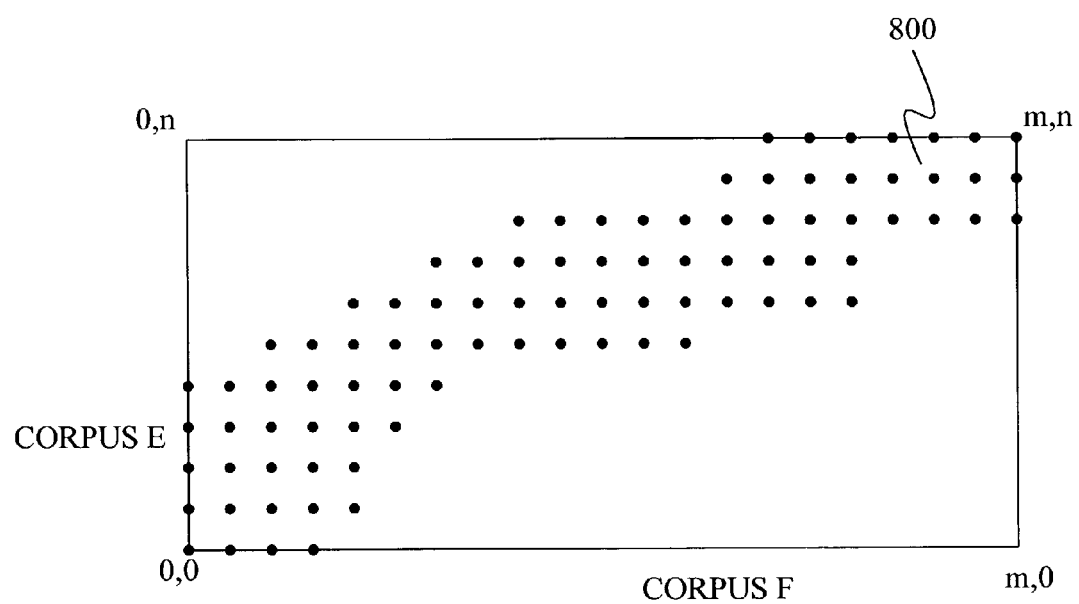
FIG. 7 is a pruned alignment trellis.

Once the backward pass is complete, a pruned trellis has been formed. Under some embodiments, only 10 percent of the original possible alignment states remain after the pruning. FIG. 7 provides an example of a pruned trellis 800. This represents an estimate of possible alignments that are predicted using a length-based alignment model.

The process of FIG. 3 continues at step 310 where a translation model is constructed using the high probability ef alignments identified during the backward pass. This translation model will be used below to select one of the possible alignment paths identified during the backward pass.

Figure 8:
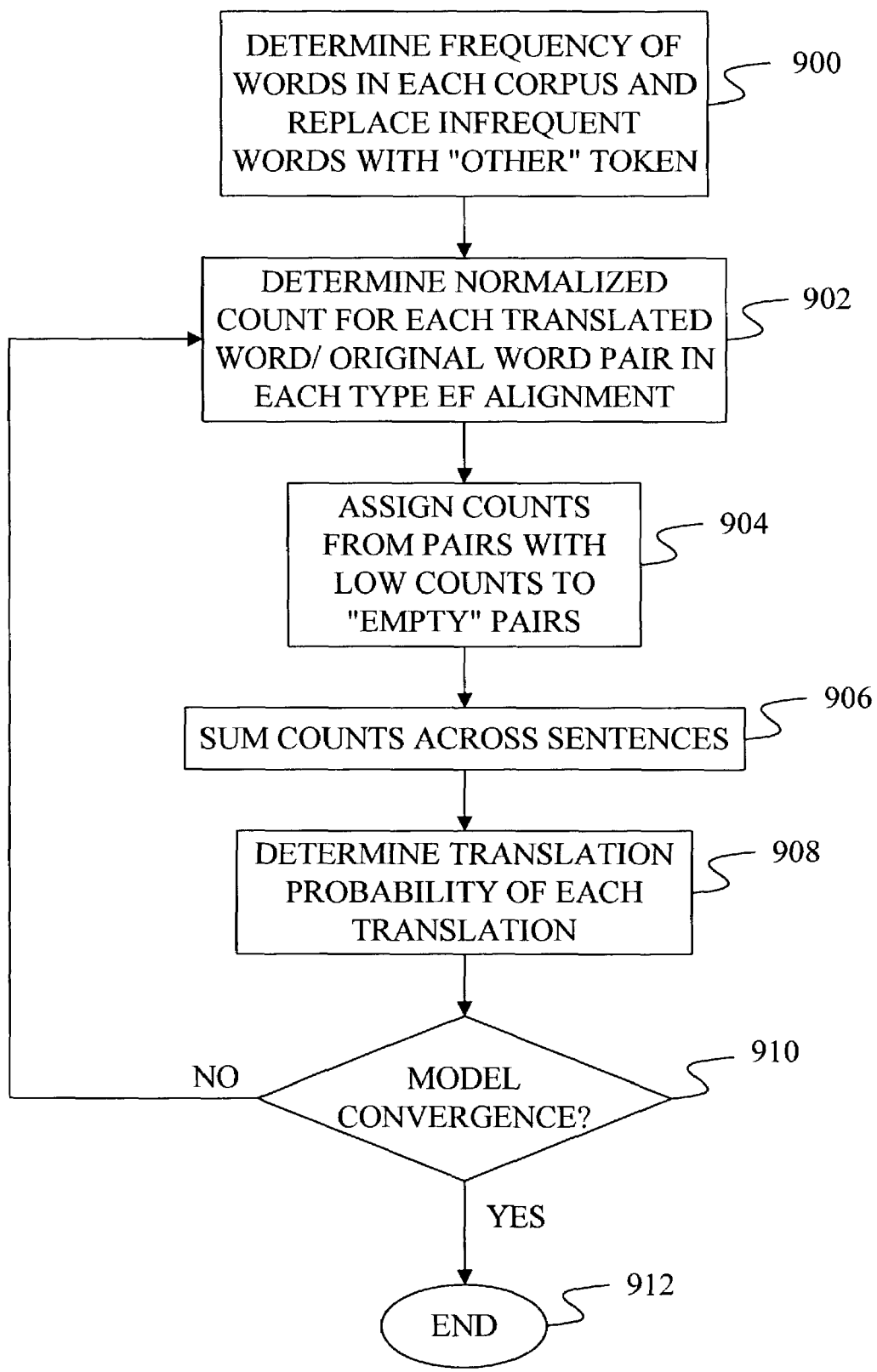
FIG. 8 is a flow diagram of a method of training a translation model under many embodiments of the present invention.

FIG. 8 provides a flow diagram of a method under the present invention for generating the translation model. This method is built upon a method described in Brown et al., The Mathematics of Statistical Machine Translation: Parameter Estimation, *Computational Linguistics*, 19(2):263-311, 1993. In particular, it is built upon the Model 1 translation model constructed in Brown. However, embodiments of the present invention modify the method in Brown to increase its efficiency.

In step 900, the frequency of each word in each corpus is determined and infrequent words are replaced with an "other" or generic token. This substitution reduces the number of different translation possibilities that must be considered. Under one embodiment, a word is infrequent if it only occurs once in the corpus or occurs less frequently than the top 5000 most frequent words in the corpus.

At step 902, the pairs of sentences associated with the high probability ef alignments identified during the backward pass of the length-based alignment are used to develop counts for possible word translations. In particular, for a given pair of sentences, a original word/translated word pair is formed for each possible pairing of a word in the sentence of language E with a word in the sentence of language F. For example, if the sentence of language F contains words A, B, and C and the sentence of language E contains words T, U, V, and W, the word pairs TA, UA, VA, WA, TB, UB, VB, WB, TC, UC, VC, and WC would be formed. In addition, since it is possible that a word in a sentence of F will not correspond to any word of E, an "empty" token "*" is provided as a possible word of the original language E. As a result, the additional pairs *A, *B, and *C are formed.

For each word pair, a probability of the pair, in other words the probability that the first word of the pair generated the second word of the pair, is determined. The probability is normalized within the sentence and is referred to as a count. Initially, all pair combinations are equally likely. As such, each pair combination within a sentence has a probability of 1/x, where x is the number of words in the sentence of language E, including one instance of the empty token.

At step 904, counts for word pairs are examined to determine whether they are too low to be considered possible translations in a particular ef alignment. In the initial iteration of step 904, no counts are considered too low. In iterations of step 904 after the initial iteration, if a count for a word pair is considered too low, the low count is shifted to the corresponding pair with the empty token. Under one embodiment, a count is considered too low if it is as low or lower than would be obtained if the choice among the words in the E sentence of the ef alignment were random. For example, if there are x words of language E (including the empty token) to choose from in a given sentence pair and VA is assigned a count less than or equal to 1/x, then the count for VA would be added to the count for *A and the count for VA will be set to zero for that ef alignment. This is done to reduce the number of models that must be constructed for word pairs. If a word pair has a count of zero in all ef alignments, it is not assigned a translation probability.

After low count values have been assigned to the "empty" tokens, the process continues at step 906 where the counts for the various word pairs are summed across all of the ef alignments. This produces a total count for each word pair. The total counts for word pairs that have the same second word are then summed to form a set of normalization values. Thus, the total counts for all word pairs that end with the word A, would be summed to form a normalization value for word pairs that end with A. The normalization values are then divided into each of the respective total counts to produce a translation probability at step 908. In terms of an equation:

$$t(f \mid e) = \frac{\sum_{s=1}^{S} c(f \mid e)_s}{\sum_{i=1}^{n} \sum_{s=1}^{S} c(f \mid e_i)_s} \qquad \text{EQ. 8}$$

where t(f|e) is the translation probability for word e generating word f, $c(f|e)_s$ is the normalized count for word pair "ef" determined in aligned sentences s, $c(f|e_i)_s$ is the normalized count for word pair "$e_i f$" in aligned sentences s, and n is the number of different words, including the empty token, within language E.

At step 910, the translation probabilities are examined to determine if they have converged on a stable set of values. This is typically done by comparing the translation probabilities of the current training iteration to the translation probabilities of one or more previous iterations. If the translation probabilities have not converged, the process returns to step 902 where a normalized count for each translated word/original word pair is determined once again for each pair of aligned sentences.

During the second iteration, the translation probabilities for the translated word/original word pair found in the previous iteration are used to determine the normalized count. In particular, the normalized count is calculated as:

$$c(f \mid e) = \frac{t(f \mid e)}{\sum_{j=1}^{x} t(f \mid e_i)} \qquad \text{EQ. 9}$$

where c(f|e) is the normalized count, t(f|e) is the translation probability for translated word/original word pair "ef", $t(f|e_i)$ is the translation probability for word pair "$e_i f$" and x is the total number of words, including the empty token, within the language E sentence.

The process then repeats steps 904, 906, 908, 910, and 902 until the translation probabilities converge to a set of stable values. Once the translation probabilities have converged, the process of training the translation model ends at step 912.

With the translation model trained, the process of FIG. 3 continues at step 312 where a second forward search is performed using a combination of a word correspondence-based alignment model, which is based on the translation model, and the length-based alignment model. In particular, this combined model is used to identify high probability alignments in the pruned trellis formed during the backward pass of the length-based alignment, such as pruned trellis 800 of FIG. 7.

As with the first forward pass through the trellis, the second forward pass determines a forward state probability score for each point in the pruned trellis by summing together path probabilities from all preceding points that can transition to the current point.

Each path probability is the product of the state probability score for the preceding point and the probability of the alignment represented by the path between the two points. In terms of an equation:

$$\text{path\_prob}_{ji} = \text{state\_prob}_j \cdot p(\text{Alignment})_{ji} \qquad \text{EQ. 10}$$

where $\text{path\_prob}_{ji}$ is the path probability from point j to point i, $\text{state\_prob}_j$ is the forward state probability score of point j, $p(\text{Alignment})_{ji}$ is the probability of alignment represented by the path from point j to point i.

Under the combined model, the probability of alignment is a combination of a probability provided by the length-based model and a probability provided by the translation model. Like the probability of length combinations described above, the probability of alignment is calculated differently for different types of alignment.

For a type e alignment in which a sentence in language E is not aligned with a sentence in language F, the alignment probability is defined as:

$$p(\text{Alignment})_{ji} = p(\text{type\_}e)p(l_e)p(e) \qquad \text{EQ. 11}$$

where p(type_e) and $p(l_e)$ have the same definitions and are determined in the same manner as discussed above in connection with the first forward pass, and p(e) is the probability of a sequence of words e appearing in a sentence of language E. The probability p(e) is determined using the word frequency count performed during the training of the translation model. Each frequency count is divided by the total frequency count for all words in the corpus to provide a probability for each word. The probabilities of each word in the sequence C are then multiplied together to provide the probability of sequence e.

For a type f alignment in which a sentence in language F is not aligned with a sentence of language E, the alignment probability is defined as:

$$p(\text{Alignment})_{ji} = p(\text{type\_}f)p(l_f)p(f) \qquad \text{EQ. 12}$$

where p(type_f) and $p(l_f)$ have the same definitions and are determined in the same manner as discussed above in connection with the first forward pass, and p(f) is the probability of a sequence of words f appearing in a sentence of language F, which is determined in a manner similar to the determination of p(e) but using the frequency counts of words in the corpus of language F instead of language E.

For type ef alignments in which one sentence in language E is aligned with one sentence in language F, the alignment probability is defined as:

$$p(\text{Alignment})_{ji} = p(\text{type\_ef}) p(l_f | l_e) p(l_e) p(e) p(f|e) \quad \text{EQ. 13}$$

where p(type_ef) and p($l_e$) have the same definitions and are determined in the same manner as discussed above in connection with the first forward pass, p($l_f|l_e$) is determined using the Poisson distribution described by equation 3 above, p(e) is determined in the same manner as in Equation 11, and p(f|e) is the probability of a sequence of words f appearing in a sentence of language F, given a sequence of words e appearing in a sentence of language E and given the length of_f $-f$.

The probability p(f|e) is determined using the translation probabilities for the words in the two sequences of words f and e. In one particular embodiment, this probability is calculated as:

$$p(f | e) = \frac{\prod_{j=1}^{m} \sum_{i=0}^{l} t(f_j | e_i)}{(l+1)^m} \quad \text{EQ. 14}$$

where l is the number of words in sequence e, m is the number of words in sequence f, and t($f_j|e_i$) is the translation probability for translating word $e_i$ into word $f_j$ as provided by the translation model trained in step 310.

For type eff alignments in which one sentence in language E is aligned with two sentences in language F, the alignment probability is defined as:

$$p(\text{Alignment})_{ji} = p(\text{type\_eff}) \frac{p(l_{f1}+l_{f2}|l_e) p(l_e) p(l_{f1}) p(l_{f2}) p(e) p(f1 f2 | e)}{\sum_{i=1}^{l_{f1}+l_{f2}-1} p(i) p(l_{f1}+l_{f2}-i)} \quad \text{EQ. 15}$$

where p(type_eff), p($l_{f1}+l_{f2}|l_e$), p($l_e$), and p($l_{f2}$), have the same definitions and are determined in the same manner as discussed above in connection with the first forward pass, p(e) is determined in the same manner as discussed above for Equation 11, and p(f1 f2|e) is the probability of a sequence of words formed from the combination of a sequence f1 with a sequence f2, appearing in a sentence of language F, given a sequence of words e appearing in a sentence of language E and given the sum of the lengths of f1 $-f$ and f2 $-f$. This probability is determined using equation 14 above with m set to the combined length of sequences f1 and f2, and sequences f1 and f2 treated as a single sentence in language F.

For type eef alignments in which two sentences in language E are aligned with one sentence in language F, the alignment probability is defined as:

$$p(\text{Alignment})_{ji} = p(\text{type\_eef}) p(l_f | l_{e1}+l_{e2}) p(l_{e1}) p(l_{e2}) p(e1 e2) p(f|e1 e2) \quad \text{EQ. 16}$$

where p(type_eef), p($l_f|l_{e1}+l_{e2}$), p($l_{e1}$), p($l_{e2}$), have the same definitions and are determined in the same manner as discussed above in connection with the first forward pass, p(e1 e2) is the probability of two sequences of words e1 and e2 appearing in a sentence of language E, which is determined based on the frequency counts as described above for Equation 11 while treating the two sequences as occurring in a single sentence, and p(f|e1 e2) is the probability of a sequence of words f appearing in a sentence of language F, given a sequence of words formed by the combination of sequences e1 and e2 appearing in a sentence of language E and given the length of_f $-f$. This probability is determined using equation 14 above with l set to the combined length of sequences e1 and e2, and sequences e1 and e2 treated as a single sentence in language E.

Following this second forward pass, a second backwards pass is performed to assign backward state probability scores and probability scores for each alignment (given the two corpora) in the pruned trellis, using the combined model. As in the first backward pass, total state probability scores, as computed by a version of Equation 7 modified to incorporate the combined model, are used to further prune the trellis. When the second backward pass is completed, all alignments having a probability score exceeding a given threshold are produced. Under one embodiment this threshold is set to 0.5, which guarantees that no conflicting alignments for the same sentence will be produced, since it is impossible for two conflicting alignments to both have a probability greater than 0.5.

The method described in FIG. 3 provides a number of advantages over the prior art. As in certain examples of prior art, it allows for an alignment that has the accuracy of word-correspondence-based alignments, without the cost of applying the word-correspondence-based model to the entire search space, since it uses an initial, less costly method to prune the trellis before the final model is applied. However, unlike the prior art, our initial search produces scores reflecting actual probability estimates for the states in the initial search space, which allows more pruning of the search space without sacrificing accuracy than the cruder heuristic methods that have been used in the prior art.

In addition, the method allows for an alignment based on word translations without requiring the existence of a bilingual dictionary before the alignment begins. Thus, the present invention is able to bootstrap the formation of a translation model and then use that translation model to perform word correspondence-based alignment.

The invention also provides several aspects that reduce the time needed to perform the alignment including reducing the search space by defining a search band, removing infrequent translations from the translation model, and pruning alignment points during the backward pass of the length-based alignment.

Although the present invention has been described with reference to particular embodiments, workers skilled in the art will recognize that changes may be made in form and detail without departing from the spirit and scope of the invention.

What is claimed is:

1. A method of aligning sentences in a first corpus with sentences in a second corpus, the method comprising:
applying a length-based alignment model to the first corpus and the second corpus to align sentence boundaries for at least one sentence in the first corpus with sentence boundaries for a sentence in the second corpus to produce at least one aligned sentence pair wherein the length-based alignment model comprises alignment-type probabilities that provide the probability of a single sentence in the first corpus being aligned with two sentences in the second corpus;

using the aligned sentence pairs to train a translation model; and applying a combination of the translation model and the length-based alignment model to the first corpus and the second corpus to align sentence boundaries for at least one sentence in the first corpus with sentence boundaries for a sentence in the second corpus.

2. The method of claim 1 wherein the length-based alignment model comprises a probability described by a Poisson distribution that indicates the probability of a sentence of a first length in the first corpus given a sentence of a second length in the second corpus.

3. The method of claim 1 wherein applying a length-based model comprises:

identifying a subset of all possible sentence boundary alignments, wherein each sentence boundary alignment represents an alignment of a sentence boundary in the first corpus with a sentence boundary in the second corpus; and identifying a score for each sentence boundary alignment in the subset.

4. The method of claim 3 wherein identifying a subset of all possible sentence boundary alignments comprises setting two search borders to define a search band.

5. The method of claim 4 further comprising:

identifying an estimated best set of sentence boundary alignments based on the scores for each sentence boundary al ignment;

determining that one of the sentence boundary alignments in the estimated best set is within a threshold of a search border;

changing at least one search border to define an expanded search band that includes more possible sentence boundary alignments than the search band based on the determination that one of the sentence boundary alignments in the estimated best set is within the threshold of the search border; and identifying a score for each sentence boundary alignment in the expanded search band.

6. The method of claim 4 further comprising pruning some sentence boundary alignments within the search band from further consideration.

7. The method of claim 6 wherein applying the translation model comprises applying the translation model to determine a score for only those sentence boundary alignments in the search band that are not pruned from further consideration.

8. The method of claim 1 wherein using the aligned sentence pairs to train a translation model comprises using aligned sentence pairs that have an estimated probability of alignment that exceeds a threshold.

9. The method of claim 1 wherein using the aligned sentence pairs to train a translation model comprises replacing infrequent words in the first corpus with a generic token.

10. A method of aligning a first corpus with a second corpus, the method comprising:

forming a length-based alignment model by modeling the relationship between sentence lengths in a first corpus and sentence lengths in a second corpus as a Poisson distribution and setting an alignment-type probability comprising the probability of a single sentence in the first corpus being aligned with a single sentence of the second corpus;

applying the length of a first sentence from the first corpus and the length of a second sentence of the second corpus to the Poisson distribution to determine a likelihood and multiplying the likelihood by the alignment-type probability to determine the likelihood that the first sentence is aligned with the second sentence as part of a length-based alignment;

training a translation model based on the length-based alignment; and using a combination of the translation model and the length-based alignment model to perform an alignment of sentence boundaries between the first corpus and the second corpus.

11. The method of claim 10 wherein the length-based alignment comprises evaluating a subset of all possible sentence boundary alignments.

12. The method of claim 10 wherein the length-based alignment comprises pruning sentence boundary alignments from further consideration.

13. The method of claim 12 wherein using the translation model to perform an alignment of sentence boundaries comprises evaluating sentence boundary alignments that are not pruned from further consideration by the length-based alignment.

14. A method of aligning two corpora of text along sentence boundaries, the method comprising:

estimating probabilities of a set of possible alignment points using a first alignment model;

pruning possible alignments points that receive a low estimated probability from the first alignment model;

scoring the possible alignments points that are not pruned using a second alignment model, the second alignment model requiring more computations per alignment point than the first alignment model to determine a score for an alignment point, the second alignment model comprising a combination of a length-based alignment model and a word correspondence-based alignment model, the length-based alignment model comprising alignment-type probabilities that provide a probability of a single sentence of one corpus being aligned with two sentences of the other corpus; and using the scores from the second alignment model to identify high probability alignments for segments of the two corpora.

15. The method of claim 14 wherein the first alignment model is a length-based alignment model.

16. The method of claim 14 wherein the word correspondence-based alignment model is trained based on alignments identified through the scoring performed using the first alignment model.

17. The method of claim 14 wherein scoring a set of possible alignment points using a first alignment model comprises utilizing an alignment model with a Poisson distribution.

* * * * *